Patented July 5, 1932

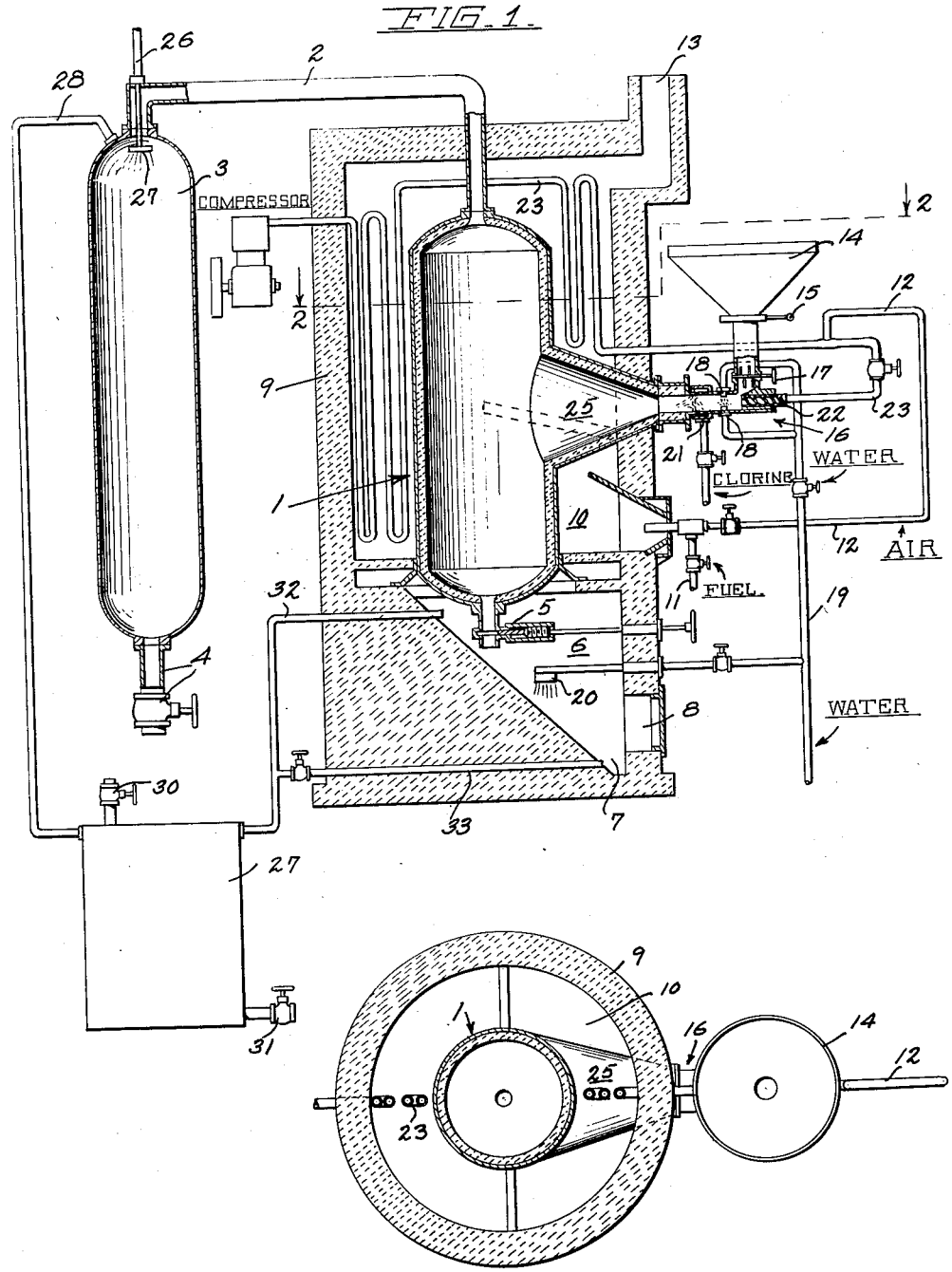

1,865,979

UNITED STATES PATENT OFFICE

JOSEPH F. TAPIE, OF SANTA BARBARA, CALIFORNIA, ASSIGNOR OF ONE-HALF TO GEORGE FISKE HAMMOND, OF SANTA BARBARA, CALIFORNIA

PROCESS FOR THE TREATMENT OF ORE

Application filed September 2, 1931. Serial No. 560,858.

My invention relates to a process for the treatment of ore.

It is an object of this invention to provide a simple and efficient process for the treatment of ore in which crushed ore is moistened with water and immediately thereafter subjected to a stream of chlorine gas which, reacting on the moistened ore, will form chlorides of the metal values. The chlorinated ore is now blown by means of heated air against an interior wall of an externally heated retort. The particles of the chlorinated ore will be scattered and subjected to the radiant heat from the walls of the retort, the heat of the retort being maintained at such a degree that the particular metal chloride under treatment, such for instance as silver chloride, will be volatilized and the metal chloride vapors conducted to a precipitating chamber where the vapors are cooled and treated with water and the precipitated chlorides are then reduced to metal in any preferred manner. The chlorinated ore is then passed from the retort downwardly into a waste ore chamber where it is sprayed with water to recover any chloride values which may have escaped volatilization; and the metal chlorides leached out of the waste ore are conducted to a secondary precipitating chamber.

Where the ore contains several metals, the process may be carried out in such a manner as to subject the ore several times to the treatment, each treatment having a degree of temperature corresponding to the volatilization point of the particular metal chloride in question so that in this manner the several metal values may be recovered successively if desired.

With the above and other objects in view, which will appear as the description proceeds, my invention consists in the steps of the process hereinafter described and claimed.

In the accompanying drawing, which forms a part of this specification, I have illustrated the preferred embodiment of an apparatus suitable for carrying out my invention, and in which Fig. 1 is a vertical cross section, partly in diagram of such an apparatus.

Fig. 2 is a horizontal section taken on the line 2—2 of Figure 1.

A vertical retort 1, preferably cylindrical in shape and lined with refractory material, is provided at its top with a vapor outlet 2 leading to a primary precipitator 3 which is provided with a valve outlet 4. Leading from the bottom of the retort is a valve waste ore outlet 5 leading into a waste ore chamber 6, provided at its lower end with a sump 7 and waste ore outlet 8. The retort 1 is installed in a suitable brick work 9 and surrounded with a heating chamber 10 supplied with fuel by means of a fuel pipe 11 and air conduit 12. The heating chamber 10 may be provided with baffle plates so as to cause the hot gases to circulate about the retort 1 in a helical path until they pass through the chimney 13.

14 is an ore hopper provided with a valve 15 through which the ore is fed into a reaction chamber 16. There is preferably an ore agitator 17 provided prior to the admission to the reaction chamber to facilitate the feeding of the ore. In the reaction chamber the ore is moistened with water by means of nozzles 18 supplied by a water pipe 19 from which a branch leads to the waste ore chamber 6 terminating therein in a spray nozzle 20. The moistened ore is next contacted with chlorine which enters the reaction chamber 16 at 21, reacting with the moistened ore and converting the metal to corresponding metal chloride. The ore is blown from the reaction chamber into the retort 1 by means of a nozzle 22 having a helical passage, the nozzle being connected to an air pipe 23 which is supplied with heated air under pressure. While the air may be heated by any preferred means, I have shown the air pipe 23 disposed in the heating chamber 10; 24 being an air compressor maintaining a constant pressure in the pipe 23. The reaction chamber 16 is in communication with a cone shaped ore inlet port 25 preferably centrally disposed in the retort 1 so that the chlorinated ore will be thrown with considerable force against the interior wall of the retort 1.

The principal precipitator 3 is provided with a water supply pipe 26 terminating in a spray nozzle 27. From the upper end of the principal precipitator 3 a pipe 28 leads to a secondary precipitator 29 provided with a valve air and gas outlet 30 and a valve liquid outlet 31. A vapor pipe 32 leads from the upper part of waste ore chamber 6 to the secondary precipitator 29 and a liquid pipe 33 leads from the sump 7 to the pipe 32.

*Operation.*—The ore such as copper ore is crushed to a suitable fineness, such as 40 mesh or finer, and is fed from the hopper 14 into the reaction chamber 16 where it is moistened with water issuing from the nozzles 18. The ore is blown from the reaction chamber 16 by means of the air nozzle 22 through the ore port 25 against the interior wall of the retort opposite the ore inlet port. On its passage it comes in contact with a stream of chlorine gas which is introduced at 21 into the reaction chamber. I find that chlorination is greatly facilitated by first moistening the ore and subsequently contacting the same with chlorine gas in place of using hydrochloric acid for the reason that a number of chlorine compounds are formed with the water which act energetically upon the ore to form metal chlorides. The amount of water and chlorine will vary depending upon the richness of the ore but will generally run from 1 to 4 gallons of water and 1/7 to 3/7 of a pound of chlorine gas per ton of ore under treatment. In order to subject the chlorinated ore instantly to a temperature which will volatilize the metal chloride, I preheat the air which issues from the nozzle 32. Preheating may be from 675 to 2500 degrees F. depending upon the nature of the metal of the ore. It will be understood by those skilled in the art that such temperatures will be maintained in the reaction chamber 16 which will give the most favorable results in the chlorination of the ore and that the retort will be heated to such a temperature that the ore as it strikes the interior of the wall of the retort 1 and during the short time that it is dispersed and falling through the heating zone within the retort, the metal chloride will volatilize, at least the greater part thereof, and pass off in vapor form through the pipe 2 and into the principal precipitator 3 where in coming in contact with the sprayed water issuing from the nozzle 27 the chlorides will be precipitated and the chloride solution will be taken off through the outlet 4 for any suitable or preferred treatment to recover the metal. It will be understood that in addition to the vapors, steam and dust will be carried along with the chloride vapors which will likewise be precipitated and removed through the principal precipitator 3. The incondensable portions and some of the dust will be carried through pipe 28 to the secondary precipitator 29.

The ore is not allowed to accumulate to any great extent in the retort, but is maintained in a volume not to exceed about one-sixth of the volume of the retort. The ore is continuously fed through the retort and downwardly through the valved outlet 5 into the waste ore chamber 6, where it is sprayed with water through the nozzle 20. Such constituents as are soluble in the ore will pass into solution and will be conveyed from the sump 7 to the pipe 33 and to the secondary precipitator 29 which is also in communication through pipe 32 with the upper part of the waste ore chamber 6 to recover any values from the vapors generated in the waste ore chamber 6.

When an ore having metals, such as lead, silver and gold, is to be treated, the temperature conditions may be maintained in such a manner that the lead chloride, silver chloride, and gold chloride, may pass at once in vapor form from the retort to the precipitators or, if it is desirable to keep the metals separate, the ore may be subjected to successive treatments through the apparatus, first at a lower temperature sufficient to volatilize the lead chloride, then the silver chloride, and the gold chloride.

Various changes in the steps of the process may be made by those skilled in the art without departing from the spirit of my invention as claimed.

I claim:

1. A process for treating ores comprising moistening crushed ore with water, contacting the moistened ore with chlorine thereby forming chlorides with metals contained in the ore, projecting the chlorinated ore against a heated surface to volatilize the metal chlorides in the ore, and precipitating the chloride vapors.

2. A process for treating ores comprising moistening crushed ore with water, contacting the moistened ore with chlorine thereby forming chlorides with metals contained in the ore, projecting the chlorinated ore against a heated surface by means of a current of heated air, and precipitating the chloride vapors.

3. A process for treating ores comprising moistening crushed ore with water, contacting the moistened ore with chlorine thereby forming chlorides with metals contained in the ore, projecting the chlorinated ore against a heated surface by means of a current of heated air to volatilize the metal chlorides in the ore, precipitating the chloride vapors, and leaching the waste ore to recover any soluble metal values contained therein.

In testimony whereof I have signed my name to this specification.

JOSEPH F. TAPIE.